(12) United States Patent
Sellars et al.

(10) Patent No.: US 8,650,753 B2
(45) Date of Patent: Feb. 18, 2014

(54) SEAL AND A METHOD OF MANUFACTURING A SEAL

(75) Inventors: Christopher Sellars, Derby (GB); Glen Pattinson, Derby (GB); John T Gent, Derby (GB)

(73) Assignee: Rolls-Royce, PLC, London (GB)

( * ) Notice: Subject to any disclaimer, the term of this patent is extended or adjusted under 35 U.S.C. 154(b) by 1156 days.

(21) Appl. No.: 12/588,250

(22) Filed: Oct. 8, 2009

(65) Prior Publication Data

US 2010/0143103 A1 Jun. 10, 2010

(30) Foreign Application Priority Data

Dec. 10, 2008 (GB) .................................. 0822416.4

(51) Int. Cl.
  *B21D 53/84* (2006.01)
  *F01D 11/08* (2006.01)
  *B05D 1/36* (2006.01)
  *F16J 15/447* (2006.01)

(52) U.S. Cl.
  USPC ........ 29/888.3; 29/424; 29/889.2; 415/173.4; 415/173.5; 415/174.4; 415/174.5; 427/446; 427/447; 427/452; 427/454; 427/247; 427/353; 427/372.2; 427/384; 427/421.1; 427/427.5; 427/429; 427/405; 427/409; 427/413; 427/416; 427/419.2; 277/303; 277/415; 277/591; 277/595

(58) Field of Classification Search
  USPC ........ 29/888.3, 424, 889.2; 415/173.4, 173.5, 415/174.4, 174.5; 277/415, 591, 595, 303; 427/446, 447, 452, 453, 424, 455, 456, 427/156, 247, 353, 372.2, 384, 421.1, 427/427.5, 429, 454
  See application file for complete search history.

(56) References Cited

U.S. PATENT DOCUMENTS

| | | | |
|---|---|---|---|
| 3,350,178 A * | 10/1967 | Miller | 428/158 |
| 3,547,455 A | 12/1970 | Daunt et al. | |
| 4,071,932 A * | 2/1978 | Standaart et al. | 445/34 |
| 4,257,735 A | 3/1981 | Bradley et al. | |
| 5,024,884 A | 6/1991 | Otfinoski | |
| 5,080,934 A * | 1/1992 | Naik et al. | 427/271 |
| 5,388,959 A | 2/1995 | Forrester et al. | |

(Continued)

FOREIGN PATENT DOCUMENTS

| | | |
|---|---|---|
| EP | 1 013 890 B1 | 6/2000 |
| EP | 1 878 876 A2 | 1/2008 |
| WO | WO 93/06342 | 4/1993 |

OTHER PUBLICATIONS

Oct. 24, 2012 Search Report issued in European Application No. EP 09 25 2387.

*Primary Examiner* — Sarang Afzali
(74) *Attorney, Agent, or Firm* — Oliff PLC

(57) ABSTRACT

A seal (48) between a compressor rotor blade (26) and compressor casing (28) comprises an abradable structure (59) on the compressor casing (28). The abradable structure (59) comprises a metallic foam (60) having pores (66, 68). The metallic foam (60) has a first a region (62) and a second region (64). The first region (62) of the metallic foam (60) is arranged adjacent to the compressor casing (28) and the second region (64) of the metallic foam (60) is spaced from the compressor casing (28) by the first region (62) of the metallic foam (60). The pores (68) of the second region (64) of the metallic foam (60) contain an abradable material (70) and the pores (66) of the first region (62) of the metallic foam (60) do not contain an abradable material.

33 Claims, 2 Drawing Sheets

(56) References Cited

U.S. PATENT DOCUMENTS

| | | |
|---|---|---|
| 6,783,642 B2 * | 8/2004 | Gueldry et al. ............ 204/192.2 |
| 7,955,049 B2 * | 6/2011 | Hopkins .................... 415/173.4 |
| 2001/0042607 A1 | 11/2001 | Roesler et al. |
| 2004/0137259 A1 | 7/2004 | Pabla et al. |
| 2007/0122269 A1 | 5/2007 | Meier et al. |

* cited by examiner

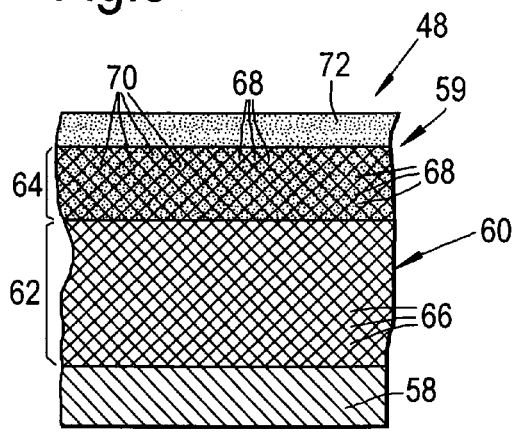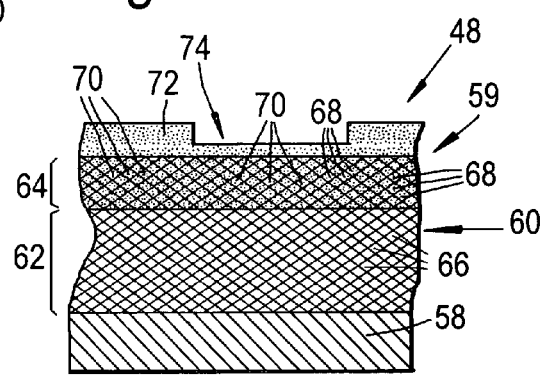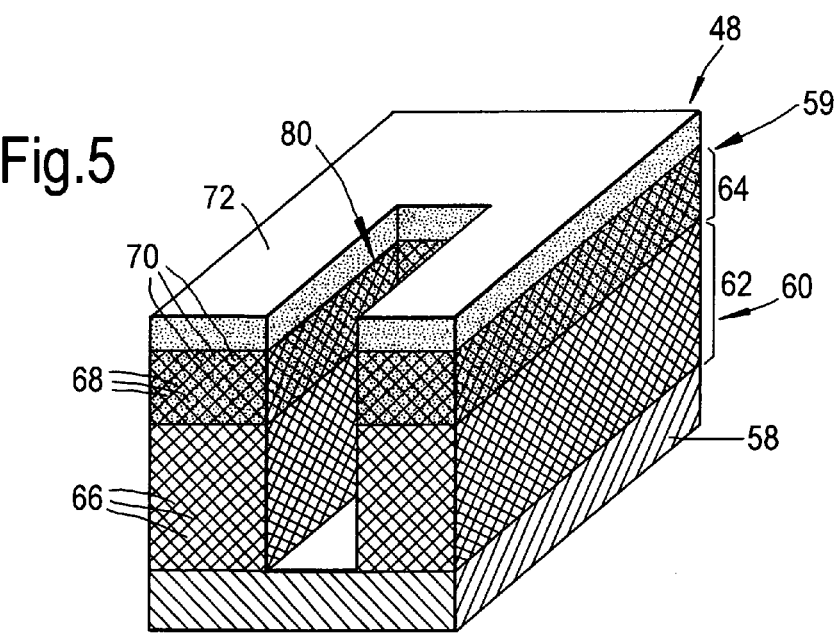

SEAL AND A METHOD OF MANUFACTURING A SEAL

BACKGROUND OF THE INVENTION

The present invention relates to a seal between relatively movable members, preferably between first and second relatively rotatable members, in particular a rotor and a stator, more particularly to a seal between a rotor blade and a casing of a turbomachine, for example a gas turbine engine.

A compressor of a gas turbine engine comprises one or more stages of compressor rotor blades arranged alternately with one or more stages of compressor stator vanes. Each of the compressor rotor blades comprises a root, a shank, and an aerofoil. The compressor rotor blades are arranged circumferentially around a compressor rotor and the compressor rotor blades extend radially from the compressor rotor. The roots of the compressor rotor blades are located in axially, or circumferentially, extending slots in the periphery of the compressor rotor. The platforms of the compressor rotor blades together define the inner boundary of a portion of the flow path through the compressor. In an alternative arrangement the compressor rotor blades are integral with the compressor rotor and are either machined from a solid disc of metal or are friction welded, electron beam welded or laser beam welded to the compressor rotor.

The compressor rotor and compressor rotor blades are surrounded by a compressor casing. A small gap, or clearance, is provided radially between the tips of the compressor rotor blades and the compressor rotor casing. The compressor casing is provided with an abradable coating on its radially inner surface immediately around the tips of the compressor rotor blades. These abradable coatings wear preferentially relative to the material of the tips of the compressor rotor blades during engine service. The abradable coatings reduce over tip leakage between the tips of the compressor rotor blades and the compressor casing and hence reduce the associated loss in engine efficiency and engine performance.

Abradable coatings are also used on the turbine casing, which is arranged radially around stages of turbine rotor blades. Abradable coatings are also used on other components of gas turbine engines.

Abradable coatings are used where there is a requirement to form a seal between a rotatable or movable component and a static component.

BRIEF SUMMARY OF THE INVENTION

Currently abradable coatings are either thermally sprayed, or plasma sprayed, metal coatings for compressors or thermally sprayed, or plasma sprayed, ceramic coatings for turbines.

Thermally sprayed abradable coatings have to provide a balance in mechanical properties between a requirement to be soft enough to be abraded and hard enough to resist erosion. This results in a compromise which is susceptible to failure.

Plasma sprayed abradable aluminium containing coatings suffer from cracking, due to coefficient of thermal mismatch between the abradable coating and the substrate and pick up of the abradable material onto the tips of the rotor blades due to excessive heat generated by frictional rubbing between the blade tips and the abradable coating. Plasma sprayed abradable aluminium containing coatings suffer from high residual stresses and spalling when the coating is more than a few millimeters thick, which restricts there use.

US patent U.S. Pat. No. 5,388,959 discloses a seal for a gas turbine engine fan casing which comprises an abradable material comprising an epoxy foam having heat expandable thermoplastic micro balloons filled with a chemical which expands when cured.

European patent EP1013890B1 discloses a seal comprising a closed metallic foam.

Our published European patent application EP1878876A2 discloses a seal between first and second relatively rotatable members and the seal comprises an abradable material on one of the components. The abradable material comprises an open cell metallic foam and polymeric films closing the cells of the metallic foam.

Polymers may only be used up to a temperature of about 200° C. Polymers suffer from galling and tearing and this limits their abradability performance.

Accordingly the present invention seeks to provide a novel seal between relatively movable members which reduces, preferably overcomes, the above mentioned problem.

Accordingly the present invention provides a seal between first and second relatively movable members, the seal comprising an abradable structure on at least one of the relatively movable members, the abradable structure comprising a metallic foam having pores, the metallic foam having a first region and a second region, the first region of the metallic foam being arranged adjacent to the at least one of the relatively movable members, the second region of the metallic foam being spaced from the at least one of the relatively movable members by the first region of the metallic foam, the pores of the second region of the metallic foam containing an abradable material and the pores of the first region of the metallic foam not containing an abradable material.

Preferably a layer of abradable material is arranged on the second region of the metallic foam.

Preferably the metallic foam is bonded to the at least one of the relatively movable members, more preferably the metallic foam is brazed to the at least one of the relatively movable members.

The metallic foam may have a uniform density.

Alternatively the metallic foam may have a graded density, the pores in the first region of the metallic foam being smaller than the pores in the second region of the metallic foam.

Preferably the pores of the metallic foam have dimensions of 1.0 mm to 1.25 mm and the thickness of the walls of the metallic foam is less than 0.25 mm.

The abradable material may comprise a polymer, a metal or a ceramic. The polymer may comprise silicone rubber or syntactic silicone rubber containing hollow spheres, e.g. hollow glass spheres. The metal may comprise aluminium, silicon and a polymer, e.g. polyester, aluminium, silicon and boron nitride or a MCrAlY and bentonite, where M is one or more of nickel, cobalt and iron and Cr is chromium, Al is aluminium and Y is yttrium. The ceramic may comprise zirconia, alumina or magnesium aluminate spinel.

Preferably the metallic foam comprises nickel or a nickel alloy, more preferably a nickel chromium alloy.

Preferably the at least one of the relatively movable members comprises a metal.

Preferably the at least one of the relatively movable members comprises nickel, a nickel alloy, steel, titanium or a titanium alloy.

Preferably the at least one of the relatively movable members is a component of a gas turbine engine.

Preferably the component is a compressor shroud or a turbine shroud.

The present invention also provides a method of manufacturing a seal between first and second relatively movable members, the method comprising bonding a metallic foam to at least one of the relatively movable members, the metallic foam having a first region and a second region, the first region of the metallic foam being arranged adjacent to the at least one of the relatively movable members, the second region of the metallic foam being spaced from the at least one of the relatively movable members by the first region of the metallic foam, filling the pores of the second region of the metallic foam with an abradable material and ensuring the pores of the first region of the metallic foam do not contain an abradable material.

Preferably a layer of abradable material is deposited on the second region of the metallic foam.

Preferably the metallic foam is brazed to the at least one of the relatively movable members.

The metallic foam may have a uniform density.

A temporary filler may be provided in the first region to ensure the pores of the first region of the metallic foam do not contain an abradable material. The temporary filler may be removed after the pores of the second region of the metallic foam have been filled with an abradable material. The temporary filler may be wax and the wax is removed by melting the wax. The temporary filler may be a water soluble material and the water soluble material is removed by dissolving the water soluble material.

Alternatively the metallic foam may have a graded density, the pores in the first region of the metallic foam being smaller than the pores in the second region of the metallic foam.

Preferably the pores of the metallic foam have dimensions of 1.0 mm to 1.25 mm and the thickness of the walls of the metallic foam is less than 0.25 mm.

The abradable material may comprise a polymer, a metal or a ceramic. The polymer may comprise silicone rubber or syntactic silicone rubber containing hollow spheres, e.g. hollow glass spheres. The polymer may be filled into the pores of the second region of the metallic foam by infiltration, e.g. by brushing or spraying. The metal may comprise aluminium, silicon and a polymer, e.g. polyester, aluminium, silicon and boron nitride or a MCrAlY and bentonite, where M is one or more of nickel, cobalt and iron and Cr is chromium, Al is aluminium and Y is yttrium. The metal may be filled into the pores of the second region of the metallic foam by plasma spraying or thermal spraying. The ceramic may comprise zirconia, alumina or magnesium aluminate spinel. The ceramic may be filled into the pores of the second region of the metallic foam by plasma spraying or thermal spraying.

Preferably the metallic foam comprises nickel or a nickel alloy, more preferably a nickel chromium alloy.

Preferably the at least one of the relatively movable members comprises a metal.

Preferably the at least one of the relatively movable members comprises nickel, a nickel alloy, steel, titanium or a titanium alloy.

Preferably the at least one of the relatively movable members is a component of a gas turbine engine.

Preferably the component is a compressor shroud or a turbine shroud.

The metallic foam is an open cell metallic foam.

BRIEF DECRIPTION OF THE DRAWINGS

The present invention will be more fully described by way of example with reference to the accompanying drawings in which:

FIG. 3 is a further enlarged schematic view of a seal between the rotor blade and a stator casing according to the present invention in its manufactured condition.

FIG. 4 is a further enlarged schematic view of a seal between the rotor blade and a stator casing according to the present invention in after use.

FIG. 5 is a further enlarged schematic view of a further seal between the rotor blade and a stator casing according to the present invention in its manufactured condition.

DETAILED DESCRIPTION OF THE INVENTION

Figure 1:
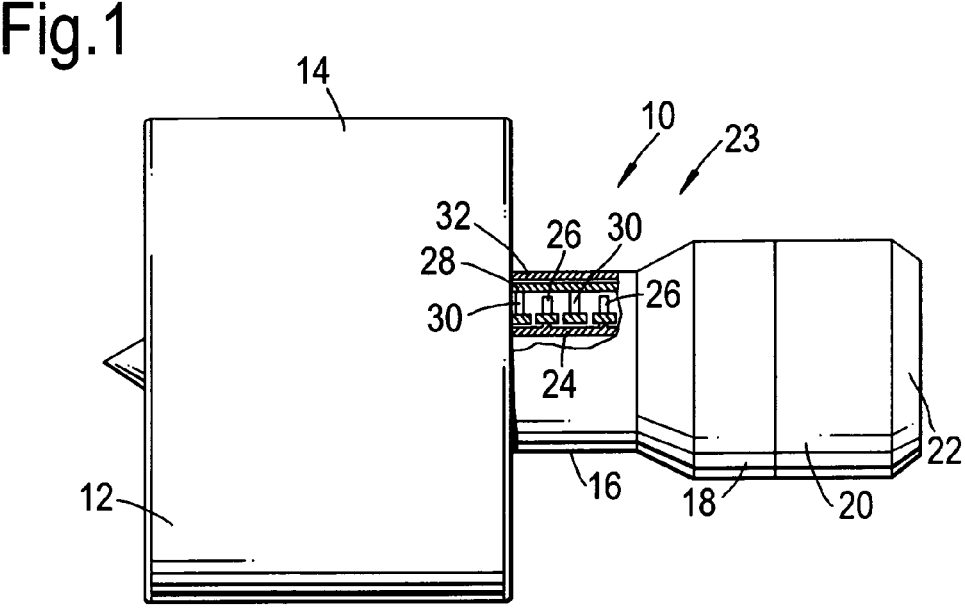
FIG. 1 shows a turbofan gas turbine engine having a seal between a rotor and a stator according to the present invention.

A turbofan gas turbine engine 10, as shown in FIG. 1, comprises in axial flow series an intake 12, a fan section 14, a compressor section 16, a combustion section 18, a turbine section 20 and a core exhaust 22. The turbine section 20 comprises a high-pressure turbine (not shown) arranged to drive a high-pressure compressor 23 in the compressor section 16, an intermediate-pressure turbine (not shown) arranged to drive an intermediate-pressure compressor (not shown) in the compressor section 16 and a low-pressure turbine (not shown) arranged to drive a fan (not shown) in the fan section 14.

Figure 2:
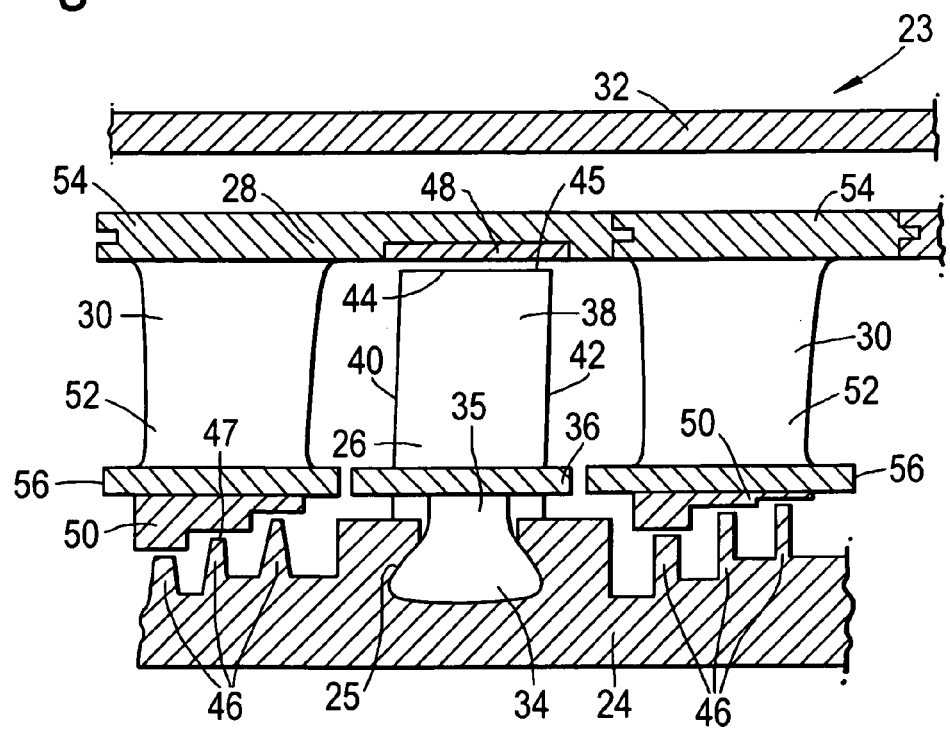
FIG. 2 is an enlarged view of a seal between a rotor blade and a stator casing and a seal between a stator vane and a rotor according to the present invention.

The high-pressure compressor 23 of the compressor section 16 is shown more clearly in FIG. 2. The high-pressure compressor 23 comprises one or more stages of compressor rotor blades 26 arranged alternately with one or more stages of stator vanes 30. Each of the compressor rotor blades 26 comprises a root 34, a shank 35, a platform 36 and an aerofoil 38. The compressor rotor blades 26 are arranged circumferentially around a compressor rotor 24 and the compressor rotor blades 26 extend generally radially from the compressor rotor 24. The roots 34 of the compressor rotor blades 26 are located in circumferentially, or axially, extending slots 25 in the periphery of the compressor rotor 24. The platforms 36 of the compressor rotor blades 26 together define the inner boundary of a portion of the flow path through the high-pressure compressor 23. The aerofoils 38 of the compressor rotor blades 26 have leading edges 40, trailing edges 42 and tips 44 at their radially outer extremities.

Alternatively the compressor rotor blades 26 are integral with the compressor rotor 24 and are either machined from a solid disc of metal or are friction welded, electron beam welded or laser beam welded to the compressor rotor 24.

The compressor stator vanes 30 also comprise aerofoils 52, which have platforms 56 at their radially inner ends and shrouds 54 at their radially outer ends. The compressor stator 30 are also arranged stator vanes circumferentially around the stator and extend generally radially. The shrouds 54 of the compressor stator vanes 30 are secured together to form a stator casing 28 for the compressor high pressure. A further outer stator casing 32 surrounds the stator casing 28.

The compressor rotor 24 also comprises one or more sealing fins 46, which extend generally radially outwardly from the compressor rotor 24 towards the platforms 56 of the stator vanes 30 to form a labyrinth seal.

A small gap, or clearance, 45 is provided radially between the tips 44 of the compressor rotor blades 26 and the stator casing 28. The stator casing 28 is provided with a seal 48, an abradable structure, on its radially inner surface immediately around the tips 44 of the compressor rotor blades 26.

These seals 48 are provided around each of the stages of the compressor rotor blades 26, between the tips 44 of the compressor rotor blades 26 and the stator casing 28. The seals 48 are carried on the shrouds 54 of the stator vanes 30. The seals 48 comprise an abradable structure 59 on the shrouds 54 of the stator vanes 30 of the stator casing 28.

A small gap, or clearance, 47 is provided radially between the tips of the sealing fins 46 and the platforms 56 of the stator vanes 30. The platforms 56 of the stator vanes 30 are provided with a seal 50, an abradable structure, on their radially inner surfaces immediately around the tips of the sealing fins 46.

The seals 50 are provided between the sealing fins 46 of the compressor rotor 24 and the platforms 56 of the stator vanes. The seals 50 are carried on the platforms 56 of the stator vanes 30. The seals 50 comprise an abradable structure 59 on the platforms 56 of the stator vanes 30.

The abradable structure 59 of the seals 48 and 50, in its manufactured condition is shown more clearly in FIG. 3, and comprises an open cell metallic foam 60. The open cell metallic foam 60 is bonded to the substrate 58 of the shrouds 54 and/or the platforms 56. The open cell metallic foam 60 has a first region 62 and a second region 64. The first region 62 of the open cell metallic foam 60 is arranged adjacent to the substrate 58 of the shrouds 54 and/or the platforms 56 and the second region 64 of the open cell metallic foam 60 is spaced from the substrate 58 of the shrouds 54 and/or the platforms 56 by the first region 62 of the open cell metallic foam 60. The pores 68 of the second region 64 of the open cell metallic foam 60 are filled with an abradable material 70 and the pores 66 of the first region 62 of the open cell metallic foam 60 do not contain an abradable material and are empty, except for any contained gas or air.

It is preferred that a layer of abradable material 72 is deposited on the second region 64 of the open cell metallic foam 60.

The open cell metallic foam 60 is initially bonded to the substrate 58 of the shroud 54 and/or platform 56 and preferably this is by brazing.

In one embodiment of the present invention the open cell metallic foam 60 has a uniform density.

During the manufacture of the seal a temporary filler is provided in the first region 62 of the open cell metallic foam 60 to ensure the pores 66 of the first region 64 of the open cell metallic foam 60 are not filled with an abradable material 70, e.g. they remain empty except for gas or air. The temporary filler is removed after the pores 68 of the second region 64 of the open cell metallic foam 60 have been filled with the abradable material 70. The temporary filler may be wax and the wax is removed by melting the wax. Alternatively the temporary filler may be a water soluble material, e.g. Aquapour® and the water soluble material is removed by dissolving the water soluble material. In order to provide, and remove, the temporary filler in the pores 66 in the first region 62 of the open cell metallic foam 60 it may be necessary to drill a hole through the substrate 58 of the shroud 54.

In another embodiment of the present invention the open cell metallic foam 60 has a graded density, e.g. the pores 66 in the first region 62 of the open cell metallic foam 60 are smaller than the pores 68 in the second region 64 of the open cell metallic foam 60. In this embodiment the fact that the pores 66 in the first region 62 of the open cell metallic foam 60 are smaller than the pores 68 in the second region 64 ensures that the pores 66 in the first region 64 are not filled with the abradable material 70.

It is preferred that the pores 66, 68 of the open cell metallic foam 60 have dimensions of 1.0 mm to 1.25 mm and the thickness of the walls of the open cell metallic foam 60 is less than 0.25 mm.

Different abradable materials 70, 72 may be used for the seal 48, 50 depending upon the application, for example the abradable material may comprise a polymer, a metal or a ceramic.

In the case of a fan rotor blade, an intermediate-pressure compressor rotor blade and/or temperatures up to about 250° C., the abradable material 70, 72 comprises a polymer and the polymer may comprise silicone rubber or syntactic silicone rubber containing hollow spheres, e.g. hollow glass spheres. The polymer is filled into the pores 68 of the second region 64 of the open cell metallic foam 60 by infiltration, e.g. by brushing or spraying.

In the case of an intermediate-pressure compressor rotor blade and/or temperatures up to 350° C., the abradable material 70, 72 comprises a metal and the abradable material 70, 72 comprises aluminium, silicon and a polymer, e.g. polyester. Such an abradable material is known as Metco 601® and is available from Sulzer Metco.

In the case of a high-pressure compressor rotor blade and/or temperatures up to 450° C., the abradable material 70, 72 comprises a metal and the abradable material 70, 72 comprises aluminium, silicon and boron nitride. Such an abradable material is known as Metco 320® and is available from Sulzer Metco.

In the case of a high-pressure compressor rotor blade and/or temperature up to 650° C., the abradable material 70, 72 comprises a metal, and the abradable material 70, 72 comprises MCrAlY and bentonite, clay, where M is one or more of nickel, cobalt and iron and Cr is chromium, Al is aluminium and Y is yttrium. Such an abradable material is known as Metco 314® and is available from Sulzer Metco. These metal based abradable materials 70, 72 are filled into the pores 68 of the second region 64 of the open cell metallic foam 60 by plasma spraying or thermal spraying.

In the case of a turbine rotor blade, the abradable material 70, 72 comprises a ceramic, and the abradable material 70, 72 comprises zirconia, alumina or magnesium aluminate spinel. These ceramics are filled into the pores 68 of the second region 64 of the open cell metallic foam 60 by plasma spraying or thermal spraying.

Preferably the open cell metallic foam 60 comprises nickel or a nickel alloy, more preferably a nickel chromium alloy. The open cell metallic foam 60 is preferably manufactured by electroplating a polymer foam and then removing the polymer foam.

Preferably the substrate 58 of the shroud 54 or platform 56 comprises a metal and comprises nickel, a nickel alloy, steel, titanium or a titanium alloy.

The open cell metallic foam 60 has better mechanical integrity and abradability properties than current thermally sprayed abradable coatings, due to a high metal to pore ratio of the open cell metallic foam 60 which allows the open cell metallic foam 60 to collapse, and/or deform during rubbing and this reduces temperatures at the rubbing interface. Conversely the open cell metallic foam 60 exhibits poor sealing properties due to the free flow of gas through the pores of the open cell metallic foam 60.

The present invention provides a second region 64 of the open cell metallic foam 60 in which the pores 68 are filled with an abradable material 70 and a first region 62 of the open cell metallic foam 60 in which the pores 66 are not filled with abradable material or are empty. In addition a layer of abradable material 72 is provided on the second region 64 of the open cell metallic foam 60. Thus, the abradable material 70 in the second region 64 of the open cell metallic foam 60 seals the open cell metallic foam 60 and prevents leakage of gas through the pores 68 of the open cell metallic foam 60.

In addition in operation the tips 44 of the compressor rotor blades 26 cut/rub a track 74 through the layer of abradable material 72 on the shroud 54, or the fins 46 cut a track 74 through the layer of abradable material 72 on the platform 56, as shown in FIG. 4. It is believed that the abradable material 70 in the region 64 of the open cell metallic foam 60 transfers the loads generated during the cutting/rubbing process to a larger surface area, over the full axial width of the seal 48, 50, than without the abradable material 70. This helps disperse the energy at the cut/rub interface and reduces the temperature at the cut/rub interface. The first region 62 of the open cell metallic foam 60 is able to collapse and/or deform in operation during rubbing/cutting and absorbs energy from the rubbing/cutting and this reduces temperatures at the rub/cut interface, as shown in FIG. 4. The first region 62 of the open cell metallic foam 60 is compliant and the inherent strain tolerance of the open cell metallic foam is able to absorb any cyclic thermal fatigue due to the difference in coefficients of thermal expansion between the abradable material 70, 72 and the substrate 58 of the shroud 54 or platform 56. The collapsing/deforming of the first region 62 of the open cell metallic foam 60 also reduces the amount of debris, e.g. abradable material 70, 72, released as the track is cut in the abradable material 70, 72. Also the first region 62 of the open cell metallic foam 60 acts as a thermal and acoustic insulator.

The present invention is also applicable to a fan casing shroud or a compressor casing shroud which has a casing treatment, e.g. a plurality of circumferentially spaced slots provided in the casing to improve the surge margin of the fan or compressor. FIG. 5 shows a perspective view of a seal 48 with a slot 80 in the abradable structure 59. The abradable structure 59 is substantially the same as that described with reference to FIGS. 3 and 4.

The invention claimed is:

1. A method of manufacturing a seal between first and second relatively movable components, the method comprising:
    bonding a metallic foam to at least one of the first and second relatively movable components,
        the metallic foam having a first region and a second region,
        the first region of the metallic foam being arranged adjacent to the at least one of the first and second relatively movable components, and
        the second region of the metallic foam being spaced from the at least one of the first and second relatively movable components by the first region of the metallic foam,
    filling pores of the second region of the metallic foam with an abradable material,
    ensuring pores of the first region of the metallic foam do not contain the abradable material, and
    depositing a layer of abradable material on the second region of the metallic foam.
2. The method as claimed in claim 1 wherein the metallic foam has a uniform density.
3. The method as claimed in claim 2 comprising:
    providing a temporary filler in the first region to ensure the pores of the first region of the metallic foam do not contain the abradable material, and
    removing the temporary filler after the pores of the second region of the metallic foam have been filled with the abradable material.
4. The method as claimed in claim 3 wherein the temporary filler comprises wax and the wax is removed by melting the wax.
5. The method as claimed in claim 3 wherein the temporary filler comprises a water soluble material and the water soluble material is removed by dissolving the water soluble material.
6. The method as claimed in claim 1 wherein the abradable material is selected from the group comprising silicone rubber and syntactic silicone rubber containing hollow spheres.
7. The method as claimed in claim 6 comprising filling the pores of the second region of the metallic foam by a method selected from the group comprising infiltrating, brushing and spraying.
8. The method as claimed in claim 1 wherein the abradable material is selected from the group comprising aluminium, silicon and a polyester, aluminium, silicon and boron nitride and a MCrAlY and bentonite, where M is one or more of nickel, cobalt and iron and Cr is chromium, Al is aluminium and Y is yttrium.
9. The method as claimed in claim 8 comprising filling the pores of the second region of the metallic foam by a method selected from the group comprising plasma spraying and thermal spraying.
10. The method as claimed in claim 1 wherein the abradable material is selected from the group comprising zirconia, alumina and magnesium aluminate spinel.
11. The method as claimed in claim 10 comprising filling the pores of the second region of the metallic foam by a method selected from the group comprising plasma spraying and thermal spraying.
12. The method as claimed in claim 1 wherein the metallic foam is selected from the group comprising nickel and a nickel alloy.
13. The method as claimed in claim 12 wherein the metallic foam comprises a nickel chromium alloy.
14. The method as claimed in claim 1 wherein the at least one of the first and second relatively movable components comprises a metal.
15. The method as claimed in claim 14 wherein the at least one of the first and second relatively movable components is selected from the group comprising nickel, a nickel alloy, steel, titanium and a titanium alloy.
16. The method as claimed in claim 1 wherein the metallic foam is bonded by brazing to the at least one of the first and second relatively movable components.
17. The method as claimed in claim 1 wherein the metallic foam has a graded density, the pores in the first region of the metallic foam being smaller than the pores in the second region of the metallic foam.
18. The method as claimed in claim 1 wherein the pores of the metallic foam have dimensions of 1.0 mm to 1.25 mm and the thickness of the walls of the metallic foam is less than 0.25 mm.
19. A seal between first and second relatively movable members, the seal comprising:
    an abradable structure on at least one of the first and second relatively movable members, the abradable structure comprising:
    a metallic foam having pores,
    the metallic foam having a first region and a second region,
    the first region of the metallic foam being arranged adjacent to the at least one of the first and second relatively movable members,
    the second region of the metallic foam being spaced from the at least one of the first and second relatively movable members by the first region of the metallic foam,
    pores of the second region of the metallic foam containing an abradable material, and
    pores of the first region of the metallic foam not containing the abradable material, wherein a layer of abradable material is arranged on the second region of the metallic foam, and wherein the metallic foam is bonded to the at least one of the first and second relatively movable members.

20. The seal as claimed in claim 19 wherein the abradable material is selected from the group comprising a polymer, a metal and a ceramic.

21. The seal as claimed in claim 20 wherein the polymer is selected from the group comprising silicone rubber and syntactic silicone rubber containing hollow spheres.

22. The seal as claimed in claim 20 wherein the metal is selected from the group comprising aluminium, silicon and a polymer, aluminium, silicon and boron nitride and a MCrAlY and bentonite, where M is one or more of nickel, cobalt and iron and Cr is chromium, Al is aluminium and Y is yttrium.

23. The seal as claimed in claim 20 wherein the ceramic is selected from the group comprising zirconia, alumina and magnesium aluminate spinel.

24. The seal as claimed in claim 19 wherein the metallic foam is selected from the group comprising nickel and a nickel alloy.

25. The seal as claimed in claim 24 wherein the metallic foam comprises a nickel chromium alloy.

26. The seal as claimed in claim 19 wherein the at least one of the first and second relatively movable members comprises a metal.

27. The seal as claimed in claim 26 wherein the at least one of the first and second relatively movable members is selected from the group comprising nickel, a nickel alloy, steel, titanium and a titanium alloy.

28. The seal as claimed in claim 19 wherein the at least one of the first and second relatively movable members is a component of a gas turbine engine.

29. The seal as claimed in claim 28 wherein the component is selected from the group comprising a compressor shroud and a turbine shroud.

30. The seal as claimed in claim 1 wherein the metallic foam is bonded by brazing to the at least one of the first and second relatively movable members.

31. The seal as claimed in claim 19 wherein the metallic foam has a uniform density.

32. The seal as claimed in claim 19 wherein the metallic foam has a graded density, the pores in the first region of the metallic foam being smaller than the pores in the second region of the metallic foam.

33. The seal as claimed in claim 19 wherein the pores of the metallic foam have dimensions of 1.0 mm to 1.25 mm and the thickness of the walls of the metallic foam is less than 0.25 mm.

* * * * *